United States Patent [19]

Gjertsen et al.

[11] Patent Number: 4,572,816
[45] Date of Patent: Feb. 25, 1986

[54] RECONSTITUTING A NUCLEAR REACTOR FUEL ASSEMBLY

[75] Inventors: Robert K. Gjertsen, Monroeville; John F. Wilson, Murrysville; John M. Shallenberger, O'Hara Township, Allegheny County, all of Pa.

[73] Assignee: Westinghouse Electric Corp., Pittsburgh, Pa.

[21] Appl. No.: 564,056

[22] Filed: Dec. 21, 1983

[51] Int. Cl.$^4$ .............................. G21C 19/33
[52] U.S. Cl. ................... 376/261; 376/364; 376/446; 29/400 N; 29/402.05; 29/402.06
[58] Field of Search ........... 29/400 N, 402.05, 402.06, 29/723; 376/261, 262, 285, 353, 364, 446

[56] References Cited

U.S. PATENT DOCUMENTS

| | | |
|---|---|---|
| 3,770,583 | 11/1973 | Klumb et al. |
| 3,814,667 | 6/1974 | Klumb et al. |
| 3,828,868 | 8/1974 | Jabsen |
| 3,992,259 | 11/1976 | Anthony et al. |
| 4,078,967 | 3/1978 | Anthony .............................. 376/364 |
| 4,208,248 | 6/1980 | Jabsen .................................. 376/446 |
| 4,219,386 | 8/1980 | Osborne et al. .................... 376/446 |
| 4,321,111 | 3/1982 | Jabsen .................................. 376/353 |
| 4,323,428 | 4/1982 | Schallenberger et al. .......... 376/446 |
| 4,376,092 | 3/1983 | Kmonk et al. ...................... 376/353 |

Primary Examiner—Deborah L. Kyle
Assistant Examiner—Richard W. Wendtland
Attorney, Agent, or Firm—D. E. Erickson

[57] ABSTRACT

A method of reconstituting a nuclear reactor fuel assembly having a top nozzle subassembly attached to the upper end of its control rod guide thimble wherein the subassembly includes an upper hold-down plate, a lower adapter plate, and a coils spring interposed between the two plates. A force is applied on the hold-down plate to compress the coil spring and transform the subassembly from its operation mode to a reconstitution mode. The wall of the thimble is severed just below a first attaching retainer mounted on the end of the thimble which defines the upward limit movement of the hold-down plate during the operation mode. Containing fingers are placed on the subassembly for removing it as a contained unit. The top nozzle subassembly or a new replacement subassembly is then replaced on the severed thimble in its reconstitution mode and a second attaching retainer is mounted on the upper end portion of the severed thimble in redefining the upward limit movement of the hold-down plate. The force is then released from the hold-down plate whereupon the top nozzle subassembly is transformed from its reconstitution mode to its operation mode.

12 Claims, 10 Drawing Figures

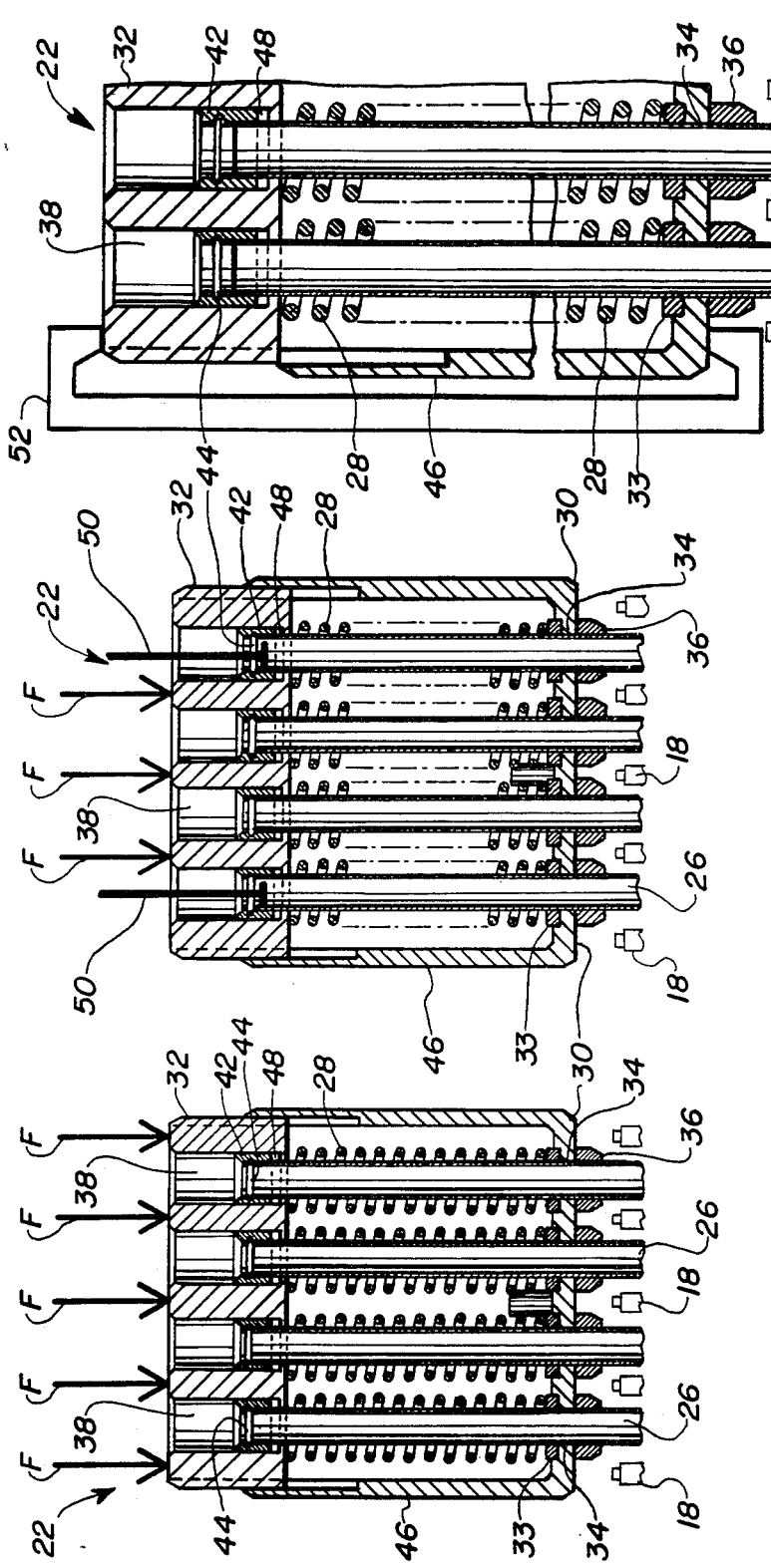

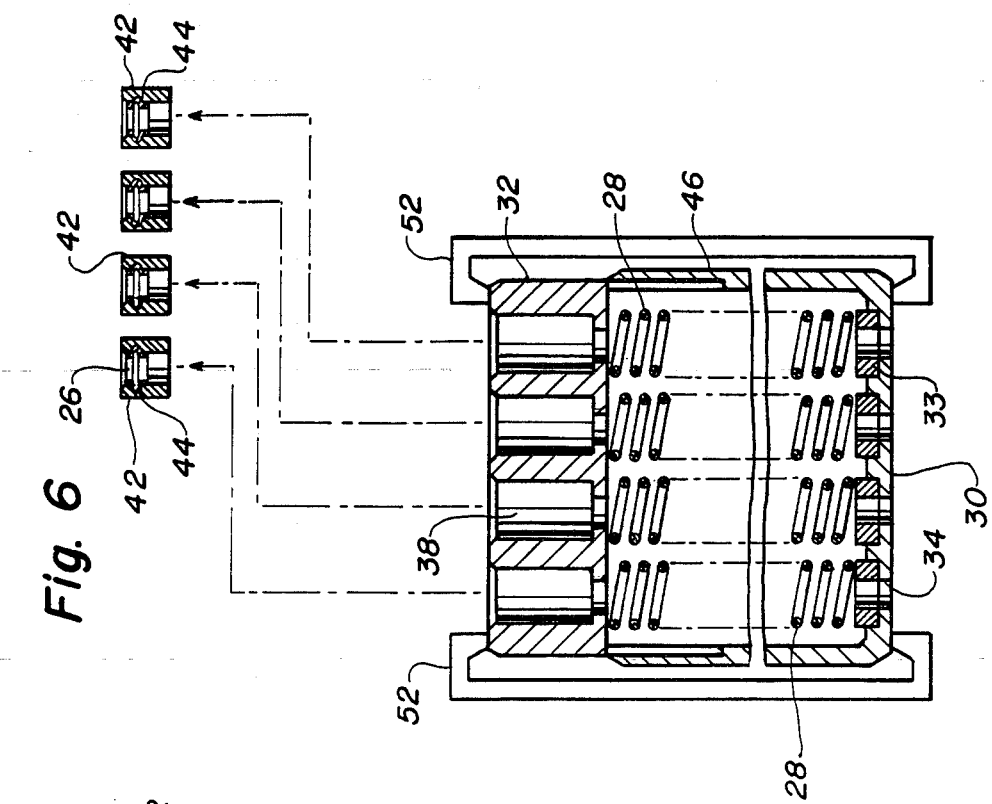
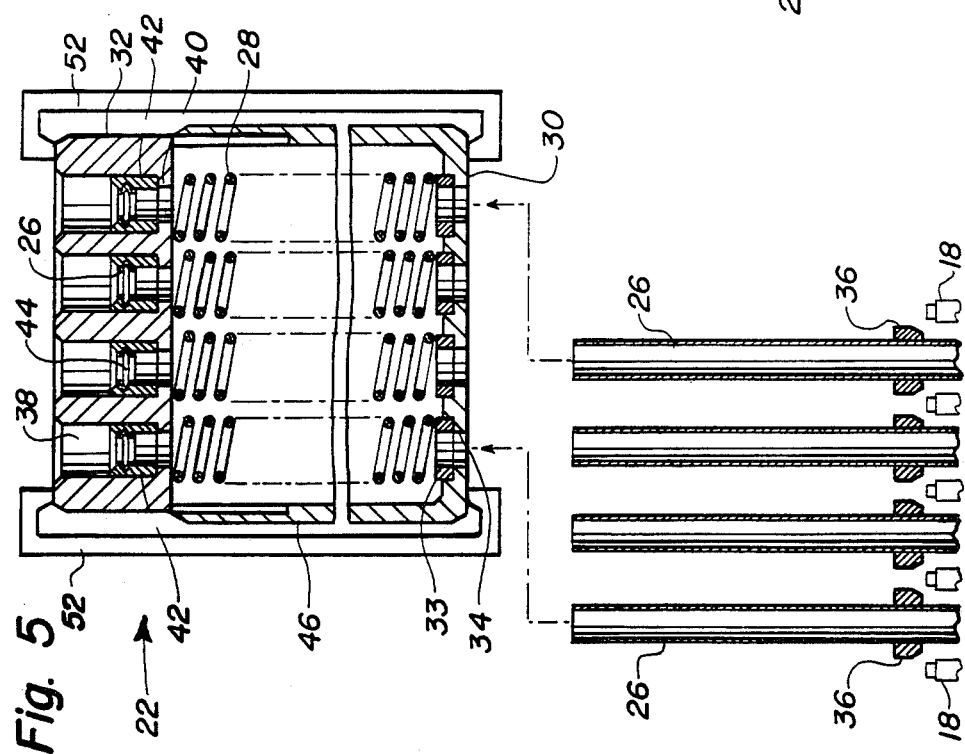

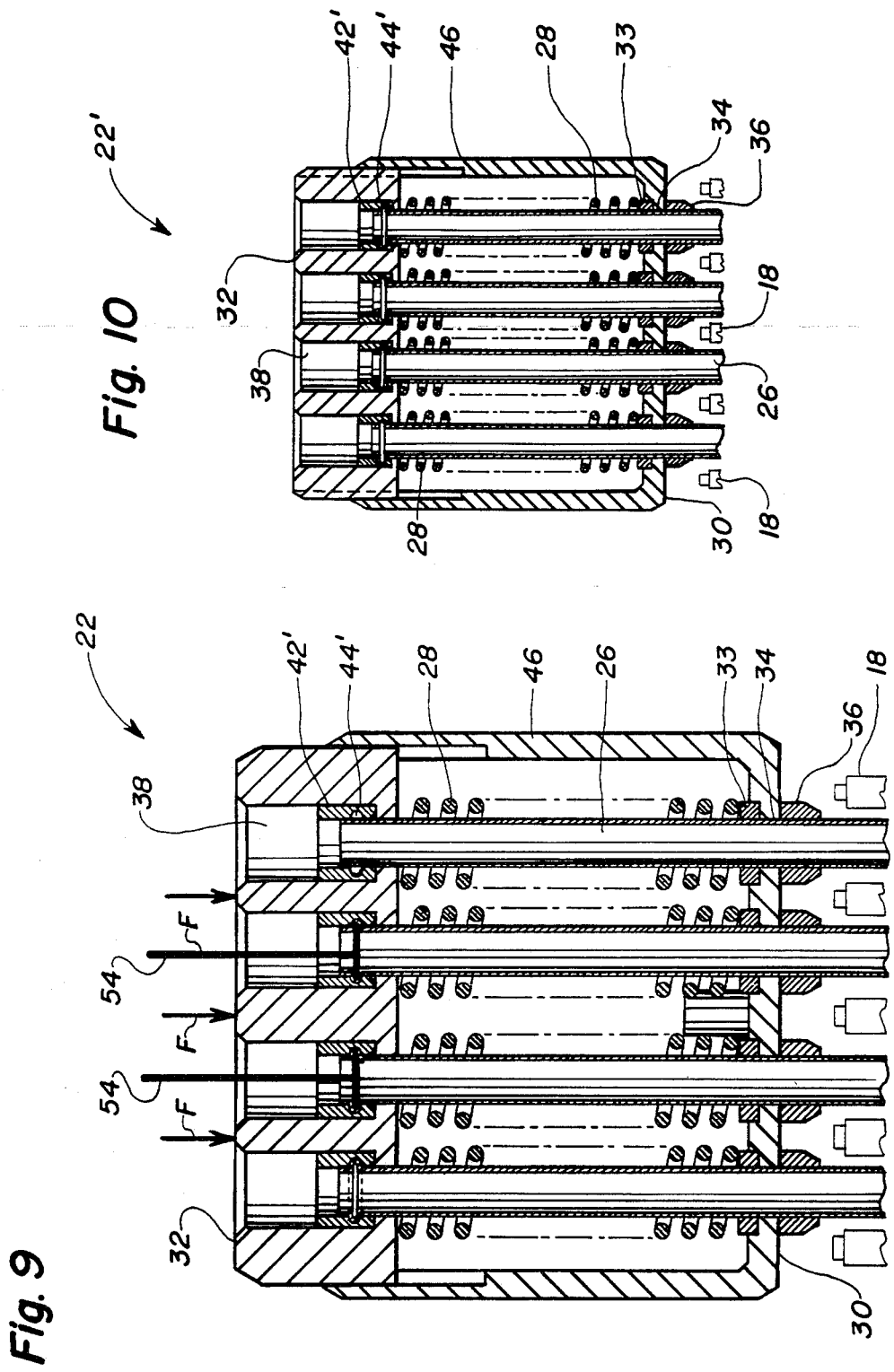

sembly in an operation mode. The invention enables the fuel assembly to be reconstituted at its on-site location within the active core region and without the possibility of the hold-down device coming apart.

Accordingly, the present invention sets forth a method for remote removal and reassembly of the top nozzle subassembly on the control rod guide thimbles, which includes the operative steps of: (a) applying a force on the upper hold-down plate to move it downwardly to compress the coil springs and transform the subassembly from its operation mode to a reconstitution mode; (b) severing the wall of the thimbles below a first attaching retainer mounted on the end of the thimbles which defines the limit of the upward movement of the hold-down plate during the operation mode; (c) removing the top nozzle subassembly from the upper end portions of the severed thimbles for the removal and replacement of fuel rods contained within the fuel assembly; (d) replacing the top nozzle subassembly in its reconstitution mode on the upper end portions of the severed thimbles; (e) mounting a second attaching retainer on the upper end portions of the severed thimbles for redefining the upward limit movement of the hold-down plate during the operation mode; and (f) releasing the force on the hold-down plate to transform the top nozzle subassembly from its reconstitution mode to its operation mode.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is a fragmentary elevational view, in section, of the top nozzle subassembly of the fuel assembly shown in FIG. 1, with direction arrows F indicating a downward force being applied to the upper hold-down plate to transform the subassembly from its operation mode to its reconstitution mode, the initial step of the reconstitution operation of the present invention.

FIGS. 3 through 10 are all diagrammatic illustrations of the further steps of the reconstitution operation performed on the top nozzle subassembly seen in FIG. 2.

FIG. 3 diagrammatically represents the severing of the thimble extensions with their associated attaching retainers while the subassembly is in its reconstitution mode.

FIG. 4 diagrammatically represents the containing of the subassembly as a unit after the thimble extensions with their associated attaching retainers have been severed. Shown is an enlarged fragmentary view of the left portion of the subassembly seen in FIG. 3 but with the force F removed and with the springs being in a free-standing condition.

FIG. 5 diagrammatically represents the removing of the subassembly as a contained unit from the severed thimble extensions.

FIG. 6 diagrammatically represents removing of the severed thimble extension end portions with their associated attached collars from the passageways of the hold-down plate.

FIG. 7 diagrammatically represents the removed subassembly being replaced on the severed ends of the thimble extensions and with force F reapplied to transform the subassembly back into its reconstitution mode.

FIG. 8 diagrammatically represents the new attaching collars, with their internal grooves being located in the lower portions thereof, being inserted into the passageways of the hold-down plate and over the projecting severed ends of the thimble extensions. This view is an enlarged fragmentary view of the upper portion of the subassembly seen in FIG. 7.

FIG. 9 diagrammatically represents the mounting of the new attaching collars to the severed thimble extension ends by circumferentially bulging the wall of the extensions into the internal annular groove of the collars.

FIG. 10 diagrammatically represents the final step of the reconstitution operation in releasing the force F on the hold-down plate to transform the subassembly from its reconstitution mode to its operation mode.

DETAILED DESCRIPTION OF THE INVENTION

Figure 1:
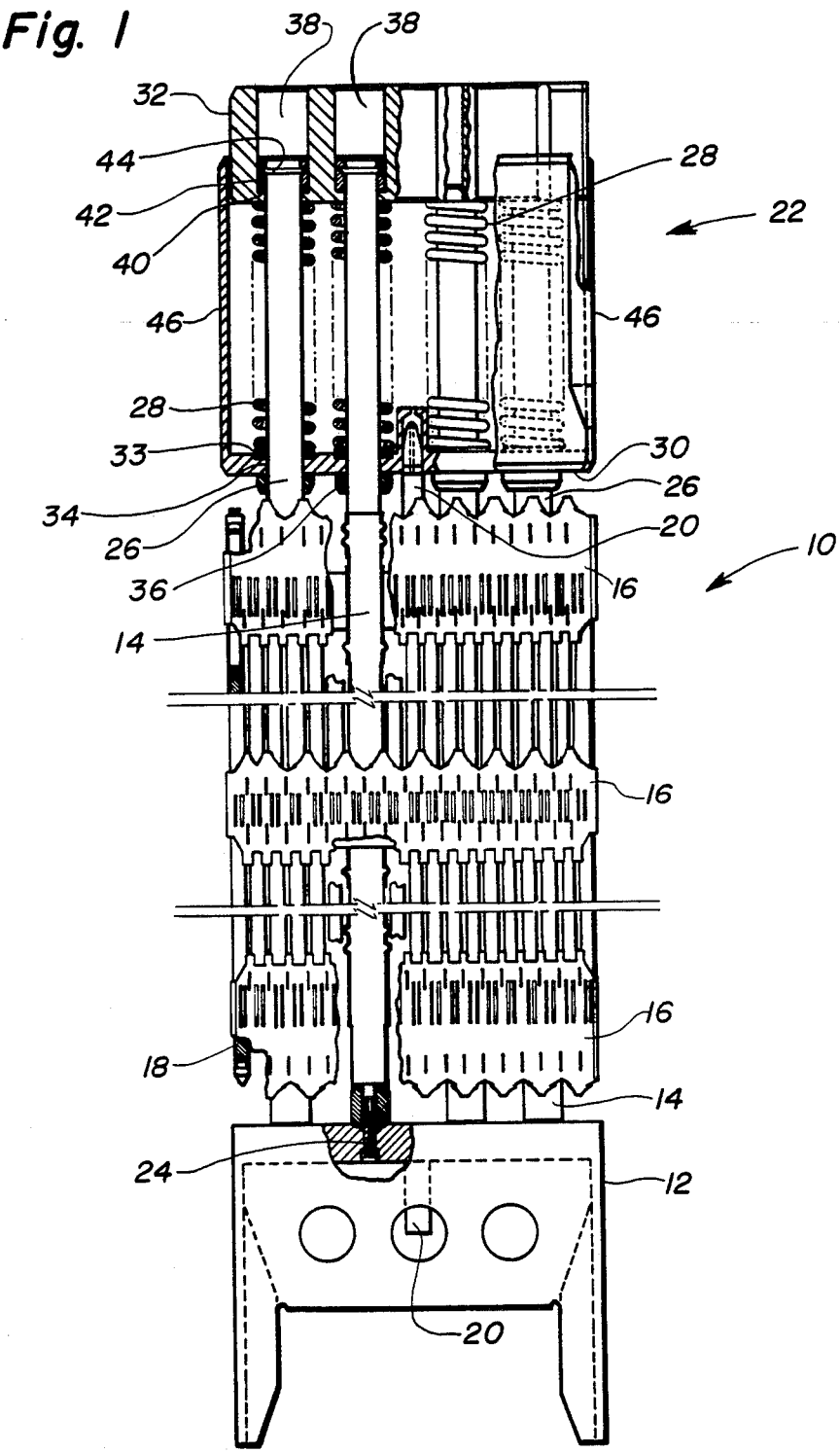
FIG. 1 is a partially sectioned elevational view, with parts being broken away for clarity, of a fuel assembly having a top nozzle construction of the type in which the principles of the present invention are directed.

In the following description, like reference characters designate like or corresponding parts throughout the several views. Also, in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown a partially sectioned elevational view, with parts broken away for clarity, of a fuel assembly, indicated generally by the numeral 10, being of the type in which the principles of the present invention are directed.

The fuel assembly 10 basically comprises a lower end structure or bottom nozzle 12 for supporting the assembly on the lower core plate (not shown) in the core region of a reactor (not shown); a number of longitudinally extending control rod guide tubes or thimbles 14 projecting upwardly from the bottom nozzle 12; a plurality of transverse grids 16 axially spaced along the guide thimbles 14; and an organized array of elongated fuel rods 18 (not one of which being shown in FIG. 1 for clarity) transversely spaced and supported by the grids 16. An instrumentation tube 20 is located at the center of the fuel assembly 10. Attached to the upper ends of the guide thimbles 14 is an end structure or top nozzle, generally designated by the numeral 22, to form an integral assembly capable of being conventionally handled without damaging the assembly components.

To form the fuel assembly 10, the transverse grids 16 are attached to the longitudinally extending guide thimbles 14 at predetermined axially spaced locations; the fuel rods 18 are inserted from below through the grids 16; the lower nozzle 12 is then suitably attached, such as by machine screws 24, to the lower ends of the guide thimbles; and then the top nozzle 22 is attached to the upper end portions of the guide thimbles 14. To control the fission process, a number of control rods (not shown) are reciprocally movable in the control rod guide thimbles 14 of the fuel assembly 10.

RECONSTITUTING A NUCLEAR REACTOR FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly With Improved Top Nozzle And Hold Down Means," by Robert K. Gjertsen and Luciano Veronesi; U.S. Ser. No. 542,625, filed Oct. 17, 1983.

2. "Nuclear Reactor Fuel Assembly With Fuel Rod Removal Means," by Robert K. Gjertsen, John F. Wilson and Walter F. Weiland; U.S. Ser. No. 545,419, filed Oct. 25, 1983.

BACKGROUND OF THE INVENTION

The present invention relates generally to fuel assemblies for nuclear reactors and, more particularly, is directed to a method of reconstituting a fuel assembly by removal and reattachment of its top nozzle.

In most nuclear reactors the core portion is comprised of a large number of elongated fuel elements or rods grouped in and supported by frameworks referred to as fuel assemblies. The fuel assemblies are generally elongated and receive support and alignment from upper and lower transversely extending core support plates. In the most common configuration, the axis of the core support barrel extends vertically and the various fuel assemblies are also arranged vertically resting on the lower support plate. Conventional designs of these fuel assemblies include a plurality of fuel rods and control rod guide thimbles held in an organized array by grids spaced along the fuel assembly length and attached to the control rod guide thimbles. Top and bottom nozzles on opposite ends thereof are secured to the control rod guide thimbles thereby forming an integral fuel assembly. The respective top and bottom nozzles extend slightly above and below the ends of the fuel rods, capturing the rods therebetween. Conventional fuel assemblies also have employed a fuel assembly hold-down device to prevent the force of the upward coolant flow from lifting a fuel assembly into damaging contact with the upper core support plate, while allowing for changes in fuel assembly length due to coreinduced thermal expansion and the like.

During operation of such assembly in a nuclear reactor, the fuel rods may occasionally develop cracks along their length resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored.

Under these circumstances, it is difficult to detect and remove failed fuel rods because they are part of an integral assembly of guide tubes welded to the top and bottom nozzles. Consequently, to gain top access to individual fuel rods, it is necessary to remove the affected assembly from the nuclear reactor core and then break the welds which secure the top nozzle to the control rod guide thimbles. In so doing, the destructive action often renders the fuel assembly unfit for further use in a reactor because of the damage done to both the guide thimbles and the top nozzle which prohibits re-welding.

In view of the high costs associated with replacing fuel assemblies, both domestic and foreign utilities have indicated an interest in reconstitutable fuel assemblies in order to minimize both their operating and maintenance expenses. In response to this interest, the nuclear reactor industry over the past years has designed different types of fuel assemblies to provide for reconstitution and have made many improvements thereupon. The majority of these reconstitutable assemblies provide a threaded arrangement whereby the top nozzle can be removed to gain access to the fuel rods contained in the skeleton assembly.

One type of such reconstitutable fuel assembly can be seen in the Klumb et al. patents (U.S. Pat. No. 3,770,583 or U.S. Pat. No. 3,814,667). The fuel assembly shown has a top nozzle that is mechanically fastened to the upper ends of the control rod guide thimbles. More particularly, the top nozzle is of the type having a holddown device incorporated therewithin and essentially includes coil springs coaxially disposed about upwardly extending alignment posts that are threaded through an end plate which has a fastener nut positioned on its underside. An upper hold-down plate is slidably mounted on the alignment posts and the coil springs are interposed, in compression, between the hold-down plate and the end plate. A radially enlarged shoulder on the upper end of the alignment posts retains the hold-down plate on the posts. As recognized in the later Anthony et al. patent (U.S. Pat. No. 3,992,259), the threaded joint connection is such that, following irradiation of the fuel assembly, access to and disassembly of the joint is practically impossible. In an attempt to improve upon the Klumb et al. device, Anthony et al. set forth a different threaded joint arrangement.

The Jabsen patent (U.S. Pat. No. 3,828,868) shows yet another type of reconstitutable fuel assembly employing a threaded arrangement. Both of the opposite end plates are releasably connected to its control rod guide tubes.

All of these reconstitutable fuel assemblies employing a threaded attachment arrangement suffer from one shortcoming or another. What has been lacking is a reconstitutable fuel assembly employing a simple connection which allows for easy, remote removal and reassembly of the top nozzle to the guide thimbles, especially a top nozzle having hold-down springs surrounding the guide thimbles, and can be removed without the possibility of the hold-down device coming apart. Such a fuel assembly has been recently developed and is the subject of the above cross-referenced application, entitled "Nuclear Reactor Fuel Assembly With Improved Top Nozzle and Hold-Down Means."

SUMMARY OF THE INVENTION

The present invention provides a method for reconstitution of a fuel assembly of the type having a top nozzle subassembly including a hold-down device incorporated therewith and which is attached on the upper ends of its control rod guide thimbles. More particularly, the invention is directed to a top nozzle subassembly being of the type having a lower adapter plate, an upper hold-down plate, and a coil spring disposed on the upper end portion of each of the guide thimbles with the spring being interposed and held in compression between the plates for mounting the top nozzle subas- The fuel assembly 10 depicted in the drawings is of the type having a square array (19×19) of fuel rods 18 with sixteen control rod guide thimbles 14 strategically arranged within the fuel rod array. Further, the bottom nozzle 12 and likewise the top nozzle 22 are generally square in cross section. Still further, each of the control rod guide thimbles 14 have a separate guide thimble extension 26 connected to the upper end of the guide thimble 14 in forming a normal extension to the guide thimble. The guide thimble extension 26, referred to hereafter as thimble extension, is coaxial, having a diameter of substantially the same size as the guide thimble 14, and preferably is connected to the upper end of the guide thimble 14 by a suitable mechanical connection, such as, by bulge fitting or expanding which is well known in the art. In that specific fuel assembly represented in the drawings is for illustrational purposes only, it is to be understood that neither the shape of the nozzles, or the number and configuration of the fuel rods and guide thimbles, or the use of thimble extensions are to be limiting, and that the invention is equally applicable to different shapes, configurations, and arrangements than the ones specifically shown.

For illustrational purposes, in the preferred embodiment, the top nozzle 22 is shown in the form of a subassembly having hold-down means (device) incorporated therewithin which is the specific subject of the cross-referenced, copending, application of Robert K. Gjertsen et al., entitled "Nuclear Reactor Fuel Assembly With Improved Top Nozzle And Hold-Down Means." The specific design permits the fuel assembly 10 to be placed in the core region with its top surface in direct contact with the upper core alignment/support plate and provides a hold-down force to prevent hydraulic lifting of the fuel assembly caused by upward coolant flow, while allowing for changes in the fuel assembly length due to core-induced thermal expansion and the like.

Briefly, while still referring to FIG. 1, the top nozzle subassembly 22 basically comprises a coil spring 28 disposed about the upper end portion of each of the thimble extensions 26 and sandwiched between a lower adapter plate 30 and an upper hold-down plate 32. The lower end of the springs 28 rests on seats 33 which are positioned within counterbore cavities provided in the top surface of the lower adapter plate 30. The lower adapter plate 30 is slidably mounted, via holes 34, on the thimble extensions 26 and its downward movement therealong is limited by retainers 36, one of which being mounted on each thimble extension 26 at a location axially spaced above the upper ends of the fuel rods 18. The adapter plate 30 is formed by an arrangement of integral crosslaced ligaments (not shown) that define a plurality of coolant flow openings (not shown) having an elongated shape and is so positioned and oriented on the thimble extensions 26 such that portions of the ligaments overlie the upper ends of the fuel rods 18. The overlying relationship is such that the fuel rods 18 are axially restrained or captured between the top nozzle 22 and the bottom nozzle 12.

The upper hold-down plate 32 is also slidably mounted on the thimble extensions 26, via respective passageways 38, with each of the passageways having an internal ledge 40 defined therein. Each passageway 38 has a generally constant larger diameter upper segment and a generally constant smaller diameter lower segment, with the lower segment defining the internal ledge 40 and being slidably engageable with the thimble extension 26. Hold-down plate 32 is also provided with a number of relatively large coolant flow openings (not shown) and several smaller coolant flow openings (not shown) positioned at predetermined locations about the plate. Axially spaced above the retainer 36 is another retainer 42, mounted on each of the thimble extensions 26 and disposed within the upper segment of the respective passageways 38. In the preferred embodiment, the retainer 42 is in the form of a collar having an internal annular groove 44 in the upper portion thereof and is attached to the thimble extension by circumferentially bulging the wall of the extension into the internal collar groove 44. Attaching collars 42 cooperate with the internal ledges 40 to limit the upward movement of the hold-down plate 32 along the thimble extensions 26. In defining an enclosure for channeling the coolant flow upwardly at the upper region of the fuel assembly 10, upstanding sidewalls 46 are formed on the peripheral edges of the lower adapter plate 30. For a more detailed understanding and description of the top nozzle subassembly and its specific attachment to the upper end portions of the thimble extensions, reference should be made to the aforesaid copending application. It should also be noted here that the reconstitution method of the present invention is not limited to the particular top nozzle subassembly and its specific attachment as shown and described above, but includes other top nozzle constructions and attachment arrangements known in the art.

RECONSTITUTION OPERATION

Reconstitution of a fuel assembly, such as fuel assembly 10 shown in FIG. 1, in accordance with the teachings of the present invention will now be discussed while referring to FIGS. 2 through 10 which diagrammatically represent the various operative steps of the invention.

Initially, force F is applied to the upper hold-down plate 32 to move it downwardly, compressing the springs 28 and transforming the top nozzle subassembly 22 from its operation mode, as seen in FIG. 1, to a reconstitution mode, as seen in FIG. 2. Plate 32 is moved down a sufficient distance to provide an axial gap 48 between the lower surface of each of the attaching collars 42 and the upper surface of the corresponding ledges 40. The axial gap 48 relieves the spring force on the collars 42.

As seen in FIG. 3, with force F being maintained on plate 32 to insure the axial gap spacing 48, the upper end portion of each of the thimble extensions 26 is severed at an axial location below where the wall of the extension is bulge-fitted into the groove 44 of the attaching collar 42. A conventional in-tube cutter 50 (as schematically illustrated) is inserted through the passageway 38 and into the end of the thimble extension 26 for circumferentially cutting (from inside out) the wall of the extension, below the attachment connection of collar 42. The severing operation is repeated until all of the thimble extensions with attaching collars have been severed.

After the severing operation is completed, a pair of containing fingers 52 (only one of which being shown in FIG. 4) are placed between the upper surface of hold-down plate 32 and the lower surface of adapter plate 30 and the force F is slowly removed whereupon the compressed springs 28 expand to a free-standing condition, pushing the hold-down plate 32 upwardly into abutting contact with the upper ends of fingers 52. In such free-standing condition of springs 28, the lower surface of hold-down plate 32 is at an axial height approximately equal to the top edge of sidewalls 46. The purpose of the container fingers 52 is to hold the subassembly 22 together as a unit. It should be noted that the hold-down plate 32 and adapter plate 30 may be clamped together with the coil springs 28 being held therebetween in a compressive state, however, such compression places a load on the lower adapter plate which tends to bow or warp the plate since this plate is of a minimum thickness.

With the container fingers 52 in place, the subassembly 22 is then lifted, generally vertically, upwardly and off the severed thimble extensions 26 as a unit and removed from the fuel assembly 10 as is represented in FIG. 5. It will be noted that the severed end portions of the extensions along with their attaching collars 42 remain in the passageways 38 of the removed subassembly. With the top nozzle subassembly removed, direct access to the fuel rods 18 is obtained for the desired removal and replacement thereof.

FIG. 6 represents the intermediate step of removing the severed end portions with attaching collars from the passageways 38. Normally, this step is performed while the subassembly is at its removed location; however, these end portions could be removed in the previous step.

Figure 7:
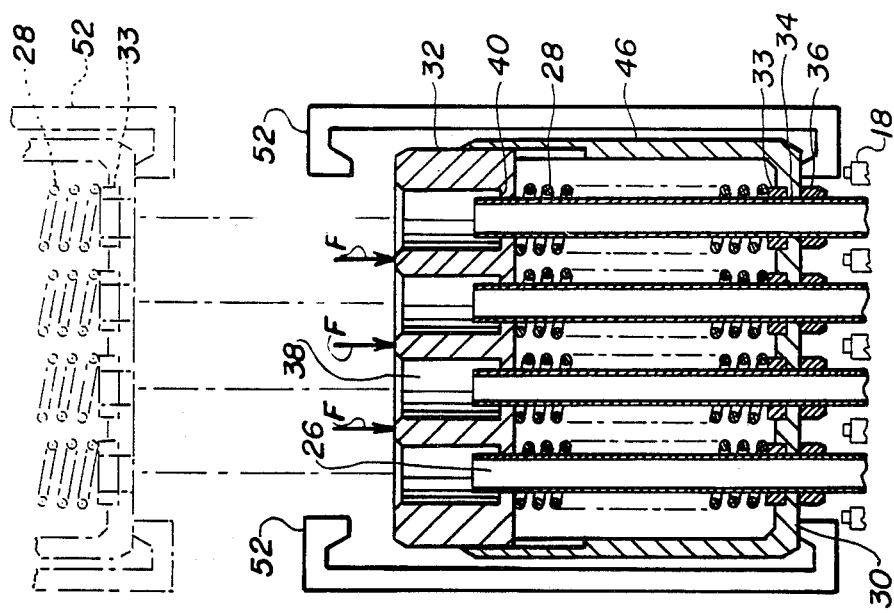

FIG. 7 represents the next step of the reconstitution operation in replacing the removed top nozzle subassembly 22 on the upper end portions of the severed thimble extensions 26. More specifically, the removed subassembly 22 or a new replacement nozzle is positioned directly over and slightly above the upper ends of the severed thimble extensions 26 with the holes 34 in the lower adapter plate 30 being aligned with the extensions. The subassembly 22, with its springs 28 and spring seats 33 intact, is lowered down onto the upper end portions of the severed extensions to a position wherein the lower adapter plate 30 rests on the retainers 36. Force F is then reapplied on hold-down plate 32 to transform the subassembly back to its original reconstitution mode and the container fingers 52 are removed. It can be seen that in such reconstitution mode the terminal severed ends of the thimble extensions project up into the upper segment of passageways 38 and are positioned above the upper surface of ledges 40. In practice, an alignment tool (not shown) comprised of a flat plate with a number of downwardly projecting prongs (corresponding to the number of thimble extensions) has been found to be very helpful in properly aligning the subassembly on the severed thimble extensions. The alignment prongs have an outer diameter slightly less than the inner diameter of the extensions, and, when in position, extend through the respective passageways 38, springs 28, seats 33, holes 34, and a short distance beyond the lower surface of adapter plate 30, such that when the subassembly is lowered, the prongs first enter into the center of the extensions and then move down therethrough as the respective components of the subassembly encircle the extensions. As can be appreciated, the alignment tool (not shown) not only assists in the proper alignment of the subassembly on the thimble extensions, but also insures that the corresponding springs and spring seats remain intact in the subassembly as it is lowered down over the thimble extensions.

Figure 8:
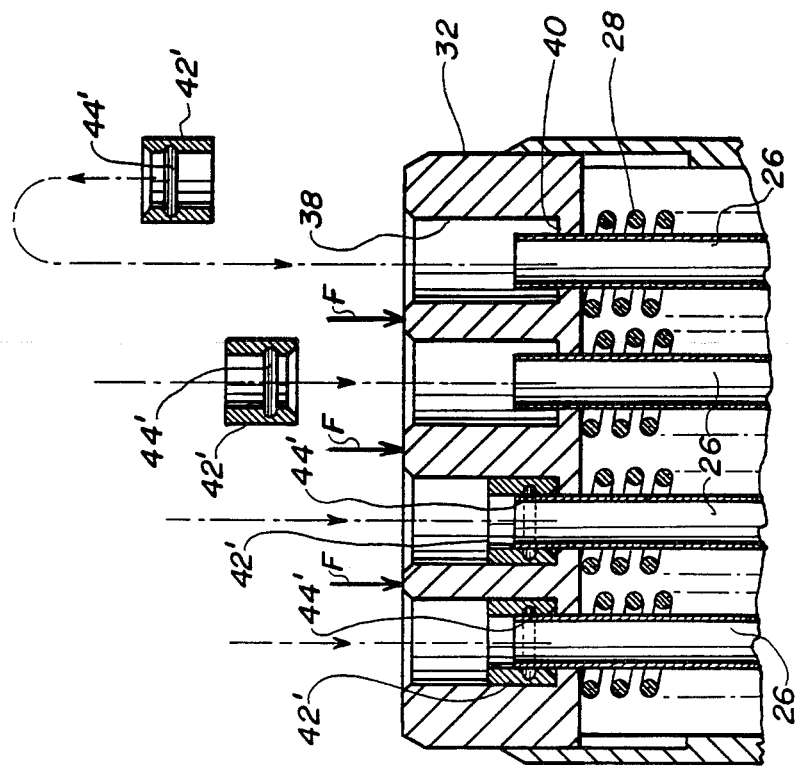

As seen in FIG. 8, with the subassembly 22 on the severed thimble extensions 26 and force F maintaining it in its reconstitution mode, new attaching collars 42', are then inserted into the passageways 38 and over the severed ends of the thimble extensions 26. Collars 42' are substantially the same as collars 42, with the difference being that the internal annular groove 44' is located in the lower portion of collar 42', whereas, the groove 44 was located in the upper portion of collar 42. The reason for the axial space difference of grooves 44 and 44' is to compensate for the length of the thimble extension which was cut off. It can be appreciated that the same collars can be used on the original manufacture of an assembly and on a reconstituted assembly, just by inverting or turning the collar upside down to position the groove either in the upper or the lower portion of the collar. It should also be noted here that the new attaching collars 42' may be inserted into the passageways 38, in the prior step, before the subassembly is lowered down onto the extensions. In such case, the alignment prongs would project down through the collars. Whether the new collars 42' are inserted into the passageways before the subassembly is placed on the extensions or afterwards is a workman's preference.

With the attaching collars 42' now in place and force F being maintained, a conventional bulging tool, such as the one schematically illustrated in FIG. 9 and designated by the numeral 54, is inserted down through passageways 38 and into the center of collars 42' where the wall of the thimble extensions are bulged into annular grooves 44' for mounting of the subassembly 22 on the severed thimble extensions. It should suffice to say that there are many well-known bulging tools available to perform such operation and that the one shown is merely for illustration purposes. The bulging procedure is repeated at each location until all of the collars 42' are bulge expanded onto their respective thimble extension.

FIG. 10 represents the final step of the reconstitution operation. With all of the collars 42' being so mounted on their respective severed thimble extensions, force F is released or removed, whereupon, subassembly 22 is transformed from its reconstitution mode to its operation mode as seen in FIG. 1.

It is thought that the invention and many of its attendant advantages will be understood from the foregoing description and it will be apparent that many modifications and variations are possible in light of the above teachings. It, therefore, is to be understood that within the scope of the appended claims, the invention may be practiced other than as specifically described.

We claim:

1. A method of reconstituting a nuclear reactor fuel assembly having a top nozzle subassembly attached to the upper end portion of its control rod guide thimble in which the subassembly includes a lower adapter plate and an upper hold-down plate disposed on the thimble's end portion, and a spring coiled about the thimble and interposed between said plates for mounting the top nozzle subassembly in an operation mode, the method of reconstituting comprising the steps of:
    (a) applying a force on the upper hold-down plate to move it downwardly to compress the spring to transform said subassembly from its operation mode to a reconstitution mode;
    (b) severing the wall of the thimble below a first attaching retainer mounted on the end of said thimble which defines the limit of the upward movement of said hold-down plate during said operation mode;
    (c) removing said top nozzle subassembly from the upper end portion of said thimble for the removal and replacement of fuel rods contained within the fuel assembly;

(d) replacing the top nozzle subassembly in its reconstitution mode on the upper end portion of the severed thimble;

(e) mounting a second attaching retainer on the upper end portion of said severed thimble for redefining the upward limit movement of said hold-down plate during said operation mode; and (f) releasing the force on said hold-down plate to transform said top nozzle subassembly from its reconstitution mode to its operation mode.

2. The reconstituting method as recited in claim 1, wherein the step of severing includes circumferentially cutting the wall of said thimble.

3. The reconstituting method as recited in claim 2, wherein the circumferential cutting is performed by inserting an internal rotary tube cutter into said thimble to an axial position just below said first attaching retainer and then cutting the wall of said thimble from its inner side to its outer side.

4. The reconstituting method as recited in claim 3, further includes removing the internal rotary cutter from said top nozzle subassembly after the circumferential cutting of said thimble has been completed.

5. The reconstituting method as recited in claim 1, wherein the step of removing said top nozzle subassembly includes first removing the force applied on said upper hold-down plate to allow said compressed spring to expand to a free-standing condition and then inserting container fingers over said subassembly to hold it together as a contained unit.

6. The reconstituting method as recited in claim 5, wherein the step of removing said top nozzle subassembly further includes raising said subassembly contained unit generally vertically upwardly until the lower adapter plate clears the severed end of said thimble and then transferring said subassembly unit to a work station site.

7. The reconstituting method as recited in claim 6, further including removing the severed end portion of the thimble with the first retainer attached thereto from the thimble passageway defined in said hold-down plate and inserting the second attaching retainer into said passageway.

8. The reconstituting method as recited in claim 1, wherein the step of replacing said top nozzle subassembly includes first aligning said subassembly on said severed thimble by placing an alignment tool which extends through said hold-down plate, said coil spring, said lower adapter plate, and into the hollow end of said severed thimble, and then lowering said aligned subassembly down onto said severed thimble end portion.

9. The reconstituting method as recited in claim 1, wherein the step of replacing said top nozzle subassembly further includes, after the subassembly has been placed on said severed thimble, reapplying a force on said upper hold-down plate to compress said spring and transform said subassembly to its reconstitution mode.

10. The reconstituting method as recited in claim 1, wherein mounting a second retainer includes placing a collar around the severed end of said thimble and then attaching it to the thimble's end.

11. The reconstituting method as recited in claim 10, wherein said collar has an internal annular groove defined therewithin and is attached to the end of said thimble by bulge expanding said thimble into said groove.

12. The reconstituting method as recited in claim 1, wherein said fuel assembly includes a plurality of control rod guide thimbles with the top nozzle's subassembly being attached to the respective upper end portion of said thimbles and including a number of coil springs corresponding to the number of thimbles with one coil spring being associated with each thimble, the reconstituting method including repeating the severing step for each of said thimbles and repeating the step of mounting a second attaching retainer for each of the severed thimbles.

* * * * *